March 16, 1954    M. E. HAMILTON    2,672,005
SIDE-DELIVERY RAKE

Filed May 21, 1951    3 Sheets-Sheet 1

Inventor
MATTHEW E. HAMILTON
By
Attorney

March 16, 1954 M. E. HAMILTON 2,672,005
SIDE-DELIVERY RAKE
Filed May 21, 1951 3 Sheets-Sheet 2

Inventor
MATTHEW E. HAMILTON
By
Attorney

March 16, 1954 M. E. HAMILTON 2,672,005
SIDE-DELIVERY RAKE
Filed May 21, 1951 3 Sheets-Sheet 3
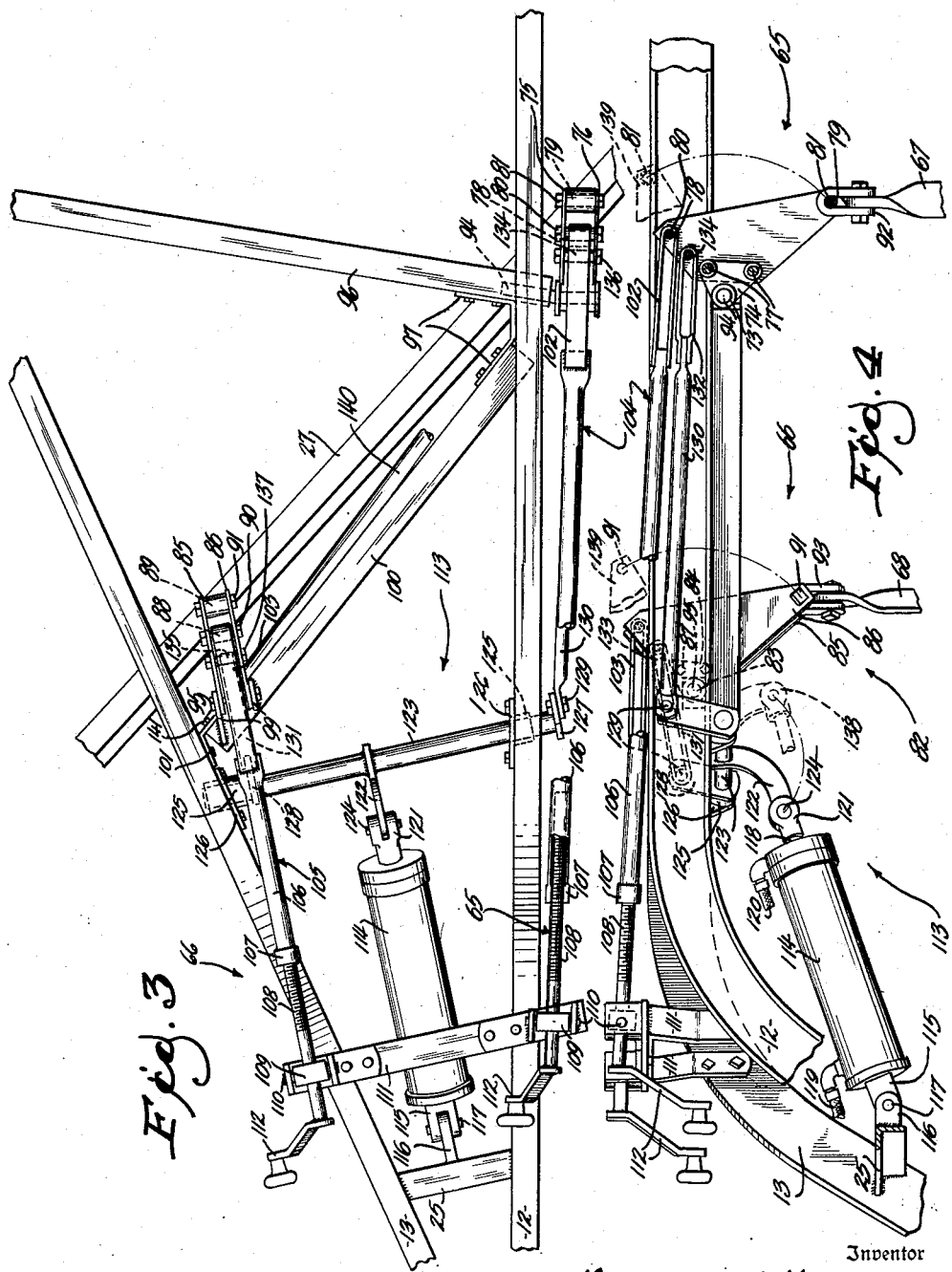
Inventor
MATTHEW E. HAMILTON
By
Attorney

Patented Mar. 16, 1954

2,672,005

UNITED STATES PATENT OFFICE 2,672,005

SIDE-DELIVERY RAKE

Matthew E. Hamilton, Stockton, Calif., assignor to J. I. Case Company, Racine, Wis., a corporation of Wisconsin Application May 21, 1951, Serial No. 227,309

11 Claims. (Cl. 56—377)

This invention relates to a new and improved side-delivery rake and an object of the invention is to improve the operation and construction of machines of this type.

A further object of the present invention is to provide improved means for suspending the raking reel from the frame including means for adjusting the elevation and angularity of the reel with respect to the ground.

Other and further important objects of the present invention will become apparent from the following detailed description and accompanying sheets of drawings, in which:

Fig. 3 is an enlarged view of a portion of Fig. 2, showing the mechanisms for adjusting the elevation and angularity of the reel with respect to the ground, with parts broken away to show details of construction.

Fig. 4 is a left-side elevational view of the structure shown in Fig. 3, with parts broken away.

Figure 1:
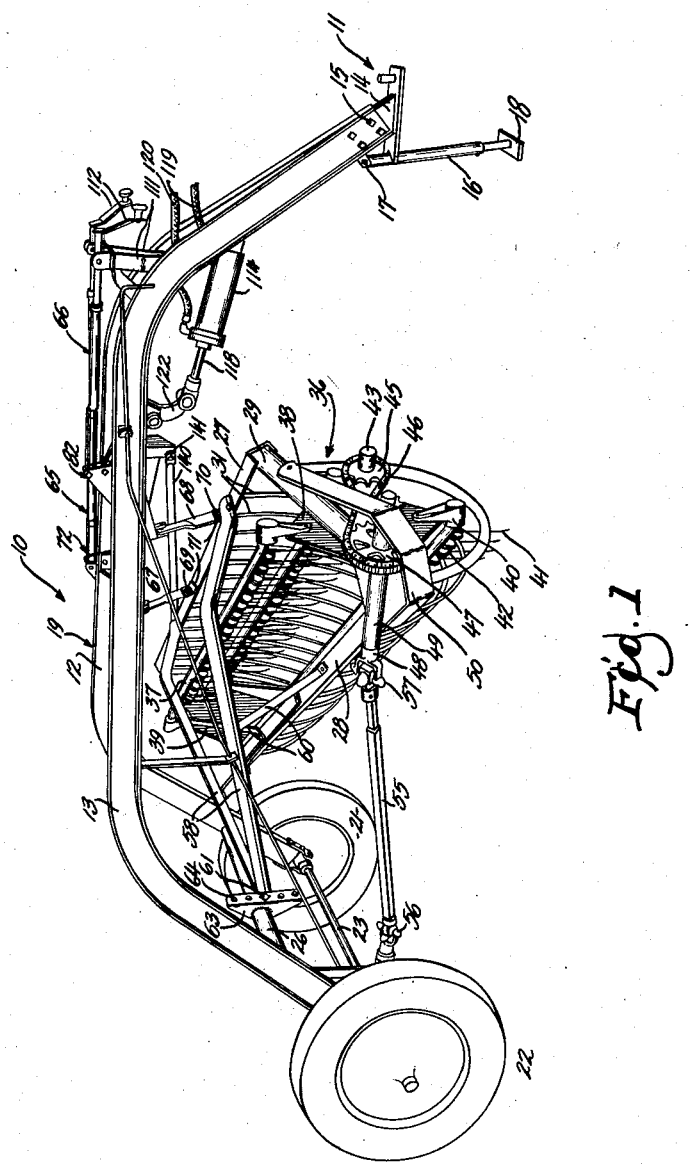
Fig. 1 is a right-front elevational view of a side-delivery rake embodying the present invention.

Referring to the drawings, the reference numeral 10 indicates generally a longitudinally disposed V-shaped arched frame which has an apex 11 at its forward end and diverging frame arms 12 and 13 extending to its rear end, the apex 11 comprising a bracket 14 which is secured adjacent the forward ends of the arms 12 and 13 by means of bolts or the like 15, and which is provided with a suitable forwardly extending clevis of any suitable type for attaching the implement to a propelling means, such as a tractor. The forward end of the frame near apex 11 is equipped with a suitable leg 16 which is hinged at 17, whereby, when the implement is supported by a tractor drawbar, or the like, the leg 16 is swung rearwardly between the arms 12 and 13. The leg 16 has a ground engaging foot 18, and when the rake is not supported by the tractor, it supports the forward end thereof.

The central part of the rake 10 is raised in an arch 19 beneath which is suspended, in a manner which will presently be described, a side-delivery cylinder frame 20. The rear end of the rake frame 10 is supported by transversely aligned wheels 21 and 22 which are mounted adjacent the rear ends of frame arms 12 and 13, respectively. The wheels 21 and 22 are rotatably journaled in any suitable or conventional manner on opposite ends of a transverse wheel axle 23 which is rotatably supported in suitable bearings 24 and fixed against axial movement therein, the bearings 24 being secured adjacent the respective ends of the frame arms 12 and 13. Suitable frame members 25 and 26 are braced between the frame arms 12 and 13 adjacent the forward and rearward ends respectively for stabilizing the frame arms in their proper spaced relationship and for resisting torsional twisting of the frame in operation.

Figure 2:
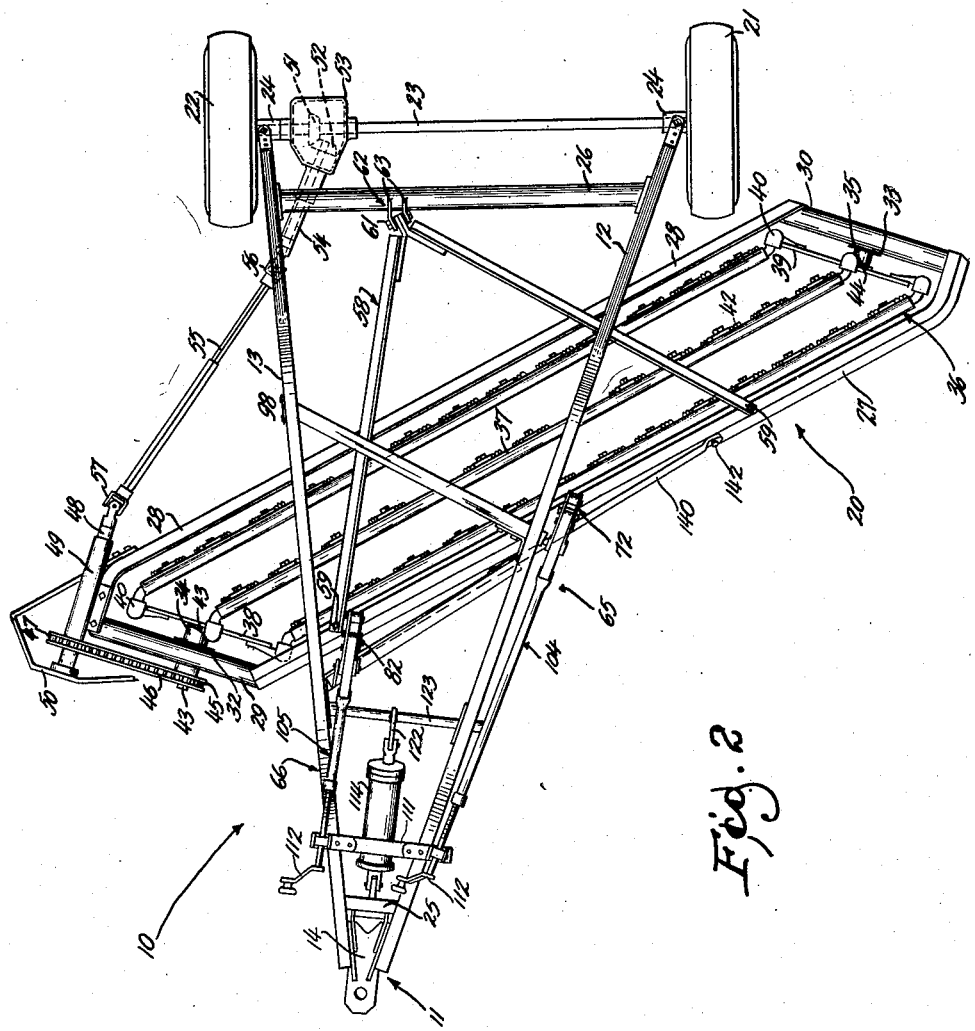
Fig. 2 is a plan view of the side-delivery rake shown in Fig. 1.

The cylinder frame is substantially rectangular in shape and comprises side members 27 and 28 and end members 29 and 30. Substantially semi-circular stripper bars 31 are provided which are positioned at regular intervals between the members 27 and 28 along the length thereof as well known in the art. Brackets 32 and 33 depend from each of the end members 29 and 30 and carry suitable bearings 34 and 35 in which is rotatably supported a raking cylinder or reel generally designated as 36 and preferably of the type which rakes the cut material in a true sideward motion instead of a forward and sideward motion of the more conventional reels. The reel 36 which can be of any suitable or well-known construction and constitutes no part of the present invention includes in the present instance tine rods 37 which are rotatably secured between substantially parallel enclosures or disks 38 and 39 by means of suitable bearings 40, the axis of the tine rods being so positioned so as to obliquely intersect the planes of the end enclosures. The tine rods have secured thereto in spaced relationship suitable tines 41 which are provided with suitable coil portions 42 for giving sufficient resiliency to the tines in operation, as well known in the art. Upon rotation of the reel, as will be explained hereinafter, the tine rods move in an elliptical path and have a substantial component of motion in the direction of their length toward the left, as appears in Fig. 2. It is the longitudinal component of the tine rods which causes the cut crop material to be moved sideways along the reel to a much greater degree than would be accomplished by the reel angle alone. The end disks 38 and 39 are provided with suitable stub shafts 43 and 44 which are rotatably supported in the bearings 34 and 35 carried by the respective depending brackets 32 and 33, as previously suggested, stub shaft 43 extending laterally from the bearing 34 adjacent the right end thereof and being provided adjacent the end thereof with a suitable gear wheel 45 which is drivingly connected by means of a suitable chain 46 to a driving gear wheel 47. Gear wheel 47 is fixed to a suitable jack-shaft 48 which is rotatably supported in a housing 49 secured to cylinder frame member 28 and in an auxiliary framework 50 extending laterally of the end member 29. A bevel gear 51 is keyed or otherwise fixed to the transverse wheel axle 23 and is adapted to engage a bevel gear 52. These bevel gears 51 and 52 are enclosed within a gear housing 53 which is suitably carried on the wheel axle 23 adjacent the right rear wheel 22 thereof. An output shaft 54, which is fixed to bevel gear 52, projects diagonally forward from the gear box 53 and is adapted to drive a similarly directed telescopic shaft 55 through a universal joint 56 of any suitable or conventional construction. The shaft 55 runs to and is connected by means of a universal joint 57 to the rearward end of jack-shaft 48 so that the rotary motion of the wheel axle 23 upon forward movement of the rake is imparted through beveled gears 51 and 52 to shaft 55 and consequently to stub shaft 43 by means of shaft 48, driving gear wheel 47, chain 46, and gear wheel 45.

A substantially V-shaped framework or swingable element 58 is secured forwardly in spaced-apart relationship to the front member 27 of the cylinder frame by means of bolts or the like 59 and is held in a slightly raised position with respect to the rear side member 28 of the cylinder frame by means of braces or supports 60. Rearwardly, adjacent the apex of the V-shaped frame 58, a bolt or the like 61 pivotally secures the frame to a clevis 62 which is formed in the present instance of parallel forwardly extending brackets 63 welded or the like to frame member 26 in spaced-apart relationship. The parallel brackets 63 are provided with aligned spaced openings 64 for supporting the V-frame 58 in adjusted pivotal positions on the clevis. It will be appreciated that by swinging the cylinder frame and consequently the reel about a pivot which is positioned rearwardly of the cylinder frame with respect to the direction of travel of the rake, that the reel is pushed with respect to the ground upon forward movement of the rake so that the reel has less tendency to lift and pass over heavy accumulations of hay or other material than if the cylinder frame was pivoted about a point forwardly of the reel. Since it is desirable in rakes of this type that the tractor be permitted to make a sharp turn without striking any part of the rake, a frame such as the V-shaped frame 58 extending forwardly and pivotally connected to a clevis, such as clevis 62, secured to some convenient point adjacent the forward portion of frame 10, would provide an obstruction forwardly of the cylinder frame and consequently limit the turning angle of the tractor with respect to the rake. In the present construction the area between the apex 11 and the cylinder frame is clear so that a tractor can make a sharp turn without striking or being limited by any obstruction.

The forward elevation of the cylinder frame and consequently of the reel is adjustable by means of a pair of reel-lift mechanisms designated generally as 65 and 66. The reel-lift mechanisms 65 and 66 are connected to the forward member 27 of the cylinder frame by means of suitable straps 67 and 68 which are pivotally secured by means of suitable bolts or the like 69 and 70 between adjacent brackets or the like 71, the brackets 71 being secured to the forward member 27 of the cylinder frame in spaced-apart relationship substantially adjacent the frame arms 12 and 13 and are so positioned with respect to the member 27 that the cylinder frame is suspended in a substantially balanced condition at three points designated forwardly by bolts 69 and 70 and rearwardly by bolt 61.

The reel-lift mechanism 65 includes in the present instance a bell crank or rockable member 72 comprising a bearing 73 having a rearwardly extending triangular flange 74. Parallel and adjacent substantially trapezoidal-shaped plates 75 and 76 are secured on opposite sides of flange 74 by means of bolts or the like 77 and spacers 78 and 79 are secured between the upper and lower ends of the plates by means of bolts or the like 80 and 81, the spacers 78 and 79 acting as pivots, as will appear hereinafter besides maintaining the plates in spaced-apart relationship.

Reel-lift mechanism 66 includes a similarly constructed bell crank or rockable member 82 comprising a bearing 83 having a flange portion 84. Trapezoidal-shaped plates 85 and 86 are secured to opposite sides of flange 84 by means of bolts 87, and spacers 88 and 89 are secured between the plates adjacent the upper and lower ends thereof by means of bolts 90 and 91.

The straps 67 and 68 are provided with a suitable looped portion 92 and 93 respectively and the bell crank 72 is suitably journaled on a stub shaft 94 adjacent frame arm 12 so that spacer 79 is received by looped portion 92 while bell crank 82 is suitably journaled on a stub shaft 95 adjacent frame arm 13 so that spacer 89 is received by looped portion 93. The stub shaft 94 is fixed as by welding or the like to one end of a member 96 carried by means of depending brackets 97 and 98 from the frame arms 12 and 13, and stub shaft 95 is carried between upwardly extending brackets 99 of a member 100, member 100 being supported from frame arms 12 and 13 by means of depending brackets 97 and 101.

The upper spacers 78 and 88 of bell cranks 72 and 82 receive slotted end or looped strap portions 102 and 103 of adjustable screws or links 104 and 105. The adjustable screws or links 104 and 105 are of substantially identical construction, each comprising in the present instance a female member 106 of tubular construction which has secured as by welding or the like adjacent one end thereof looped straps 102 or 103 and adjacent the other end thereof a suitable threaded element 107. A male member 108 is threaded into element 107 and rotatably supported adjacent the other end thereof in a thrust bearing 109, of any suitable construction, which prevents endwise movement of male member 108 therein. Each of the thrust bearings 109 are provided with trunnions 110 which are supported by means of a suitable framework 111 carried by frame 10 for permitting swinging of the adjustable screws 104 and 105 about an axis substantially parallel to the axes of the stub shafts 94 and 95 respectively. It will be apparent that female member 106 of adjustable screw 104 is of a greater length than the female member of adjustable screw 105 which it will be appreciated is to accommodate for the angularity of the cylinder frame and the location of bell cranks 72 and 82 with respect to the frame 10 so as to substantially balance the cylinder frame about bolt 57. Suitable crank handles 112 are fixed adjacent the ends of the respective male members 108 and extend forward sufficiently to be within easy reach of an operator on the tractor or other propelling means. When the crank handles 112 are turned so that the female members 106 are threaded on the male members 108 or are moved to the left as viewed in Figs. 3 and 4, the strap portions 102 and 103 pull upon the spacers 79 and 89 so as to rotate or rock the bell cranks 72 and 82 in a counterclockwise or lifting direction, the amount of swinging movement imparted to said bell cranks being in proportion to the movement to the left of female members 106. It will be apparent that upon counterclockwise or lifting movement of bell cranks 72 and 82 the cylinder frame will be swung upwardly about the bolt 61 a distance equal to the vertical distance moved by spacers 79 and 89 by means of straps 67 and 68. When the handles 112 are turned in the opposite direction, the female members are unscrewed in the male members 108 so as to move to the right, the weight of the cylinder frame and the reel being sufficient to bias the bell cranks in a clockwise direction, this clockwise movement of the bell cranks being limited only by the resistance of the adjustable screws 104 and 105. When the reel has been lowered sufficiently so as to be supported on the ground, continued movement to the right of female members 106 will have no effect upon the cylinder frame, the strap portions 93 and 94 moving or sliding on the spacers 78 and 88 and having no effect upon the respective bell cranks. It will be apparent that the lifting mechanism 65 and 77 limits the swinging movement of the cylinder frame in only one direction and in operation the reel, due to the length of the looped straps 102 and 103, is free to be moved or pushed upwardly sufficiently to pass over any obstruction normally encountered in operation without effecting any lineal movement to the adjustable screws 104 and 105. It will also be apparent that the control of bell crank 72 is independent of the control of bell crank 82 so that the operator, by means of handles 112, has complete control for regulating the height of the cylinder frame as well as the angularity of the cylinder frame with respect to the ground.

While the adjustable screws 104 and 105 are capable of moving the bell cranks 72 and 82 sufficiently in a lifting direction to raise the cylinder frame to a transport position, it is rather slow and tedious, and for moving the cylinder frame rapidly from one position to another, as for instance from a working position to another, as for instance from a working position to a transport position, a power-operated lifting mechanism 113 is provided.

The power-operated mechanism 113 includes in the present instance a hydraulic cylinder 114 of any conventional or suitable construction which is provided forwardly with a clevis 115 which is secured to a pivot 116 by means of a pin 117 of any suitable or well-known type, pivot 106 being secured as by welding or the like to the forward brace member 25. The cylinder 114 is provided with the usual actuating rod 118 which is actuated by fluid pressure selectively delivered into opposite ends of the cylinder by means of suitable conduits or hoses 119 and 120, the hoses 119 and 120 being connected to the hydraulic system of the tractor in any suitable manner as well known in the art. The rod 108 is provided with a suitable clevis 121 adjacent the end thereof which is secured to a rock arm 122 of a rock shaft 123 by means of a pin of any suitable or conventional construction 124. Rock shaft 123 is rotatably secured to the frame arms 12 and 13 by means of suitable bearings 125 fixed in depending brackets 126 and is provided adjacent its respective ends with upwardly extending rock arms 127 and 128. The rock arms 127 and 128 are pivotally connected by means of suitable bolt 129 to one end of links 130 and 131 respectively. Adjacent the ends of links 130 and 131 are secured by welding or the like looped strap portions 132 and 133 respectively which are received by spacers 134 and 135, spacer 134 being secured between plates 75 and 76 adjacent spacer 78 as by bolt or the like 136, and spacer 135 being secured between plates 85 and 86 adjacent spacer 88 as by a bolt or the like 137.

It will be apparent that upon expansion of the cylinder 114, the rock arm 122 is moved from its full-line position, Fig. 4, to the position designated by the dotted lines 138 which consequently rotates rock shaft 123 in a counterclockwise or lifting direction and swing rock arms 127 and 128 from their full-line position forwardly. The links 130 and 131 are pulled forwardly by the rock arms 127 and 128 so as to swing or rock the respective bell cranks 72 and 82 in a lifting direction in unison so that the bell cranks are moved from their full-line position, which represents their normal position when the cylinder frame is in a raking elevation to a position designated by dotted lines 139, which show a portion of the respective bell cranks including bolts 81 and 91 and which represent the position of the bell cranks when the cylinder frame is in its transport position. Upon movement of the bell cranks in a lifting direction, their respective spacers 78 and 88 move or slide rearwardly in the looped strap portions 102 and 103, and the cylinder 114 is so constructed that upon full expansion of rod 118, the bell cranks 72 and 82 will be moved from their raking position to their transport position, and the looped strap portions 102 and 103 are formed of a size sufficient to allow forward movement of the spacers 78 and 88 therein when the cylinder frame is being moved into transport position. Upon retraction of the cylinder 114, the cylinder frame and the reel are biased downwardly upon rearward movement of the links 130 and 131, and the downward movement of the bell cranks 72 and 82 is limited only by the pressure exerted by the cylinder 114 upon the rock arm 122 until the spacers 78 and 88 reach the rear end of the looped strap portions 102 and 103. Further retraction of the cylinder 114 will then move the strap portions 132 and 133 rearwardly on the spacers 134 and 135 respectively, strap portions 132 and 133 being of a size sufficient to provide for complete retraction of the cylinder 114 without effecting any movement to the bell cranks 72 and 82. It will be appreciated that if strap portions 132 and 133 did not provide for rearward movement of the links 130 and 131 on the spacers 134 and 135 after the spacers 78 and 88 reach the rear of the strap portions 102 and 103 upon further retraction of the cylinder 114, serious damage might result if the cylinder was retracted after the spacers 78 and 88 came to the end of the slotted straps 102 and 103.

A radius rod 140 of any conventional or suitable construction is pivotally secured by means of a bolt 141 to bracket 101 and by means of a bolt 142 to frame member 27 of the cylinder frame 20 for preventing lateral swinging of the cylinder frame in a manner well known in the art.

Whereas many modifications of the present invention will suggest themselves to those skilled in the art after becoming familiar with the present disclosure, and whereas such modifications are even now contemplated, it is believed that the examples depicted and described will suffice for illustration of the invention, the scope of which is not to be limited however, beyond that of the appended claims.

I claim:

1. A lift mechanism for use with an implement having a movably supported frame and a swingable element carried by the frame, said lift mechanism comprising a rockable member pivoted on said frame, means connecting one end of said rockable member to said swingable element for swinging said swingable element in one direction, an adjustable link rotatably supported on said frame while being prevented from moving axially with respect thereto and being slidably secured adjacent one end thereof to said rockable member adjacent the other end thereof whereupon said swingable element is permitted to swing in said one direction without effecting any lineal movement to said adjustable link, said adjustable link upon lineal adjustment in one direction rocking said rockable member for swinging said swingable element in said one direction, a rock shaft having a rock arm rotatably carried by said frame, a power link pivotally secured to said rock arm and slidably secured adjacent the other end thereof to said rockable member whereupon said swingable element is permitted to swing in said one direction without effecting any lineal movement to said power link, and a power-operated cylinder carried by said frame and connected to said rock shaft for rocking said rock shaft in one direction for rocking said rockable member for swinging said swingable element in said one direction.

2. A lift mechanism for use with an implement having a movably supported frame and a swingable element carried by the frame, said lift mechanism comprising a rockable member pivoted on the frame, means connecting one end of said rockable member to said swingable element for swinging said swingable element in one direction in response to rocking of said rockable member in one direction, a thrust bearing carried on the frame, an adjustable screw rotatably supported in said thrust bearing while being prevented from moving endwise therein and being provided with a slotted portion adjacent one end thereof, means on said rockable member adjacent the other end thereof for receiving the slotted end portion of said adjustable screw whereupon lineal adjustment of said screw in one direction will rock said rockable member in said one direction for swinging said swingable element in said one direction said swingable element being permitted free swinging movement in said one direction to the extent allowed by said slotted portion.

3. A lift mechanism for use with an implement having a movably supported frame and a swingable element connected to the frame, said lift mechanism comprising a rockable member pivoted on the frame, means connecting one end of said rockable member to said swingable element for swinging said swingable element in one direction in response to rocking of said rockable member in one direction, a thrust bearing carried on the frame, an adjustable screw rotatably supported in said thrust bearing while being prevented from moving endwise therein and being provided adjacent one end thereof with a slotted portion, means on said rockable member adjacent the other end thereof for receiving the slotted end portion of said adjustable screw whereupon lineal adjustment of the screw in one direction will rock said rockable member in said one direction for swinging said swingable element in said one direction, a rock shaft having a rock arm rotatably carried by said frame, a power link pivotally secured to said rock arm and provided adjacent its end with a slotted portion, means on said rockable member for receiving said slotted portion, a power-operated cylinder carried by said frame and connected to said rock shaft for rocking said rock shaft in one direction for rocking said rockable member in said one direction for swinging said swingable element in said one direction, said second-mentioned means being accommodated by the slotted portion of said adjustable screw upon rocking of said rockable member by said power-operated cylinder.

4. A lift mechanism for use with an implement having a movably supported frame and a swingable element carried by the frame and biased to swing in one direction, said lift mechanism comprising a bell crank pivoted on the frame, a link between one end of said bell crank and said swingable element for swinging said swingable element in the other direction in response to rocking of said bell crank in one direction, a thrust bearing carried on the frame, an adjustable screw rotatably supported in said thrust bearing while being prevented from moving axially therein, one end of said adjustable screw extending forwardly therefrom to within reach of the operator and the other end of said adjustable screw extending rearwardly and provided with a slotted portion adjacent the end thereof, said thrust bearing having means for permitting swinging movement of said adjustable screw about an axis substantially normal to the axis thereof, and means adjacent the other end of said bell crank for receiving said slotted portion whereupon lineal adjustment of said screw in one direction will rock said bell crank in said one direction for swinging said swingable element in said other direction.

5. A lift mechanism for use with an implement having a movably supported frame and a swingable element carried by the frame and biased to swing in one direction, said lift mechanism comprising a bell crank pivoted on the frame, a link between one end of said bell crank and said swingable element for swinging said swingable element in the other direction in response to rocking of said bell crank in one direction, a thrust bearing carried on the frame, an adjustable screw rotatably carried in said thrust bearing while being prevented from moving axially therein, one end of said adjustable screw extending forwardly therefrom to within reach of the operator and the other end of said adjustable screw extending rearwardly and provided with a slotted portion adjacent the end thereof, said thrust bearing having means for permitting swinging movement of said adjustable screw about an axis substantially normal to the axis thereof, means adjacent the other end of said bell crank for receiving said slotted portion whereupon lineal adjustment of said screw in one direction will rock said bell crank in said one direction for swinging said swingable element in said other direction, a rock shaft having a rock arm rotatably carried by said frame, a power link pivotally secured to said rock arm and provided adjacent one end thereof with a slotted portion, means adjacent the second-mentioned means for receiving the slotted portion of said power link, and a power-operated cylinder carried by said frame and connected to said rock shaft for rocking said rock shaft in one direction for rocking said bell crank in said one direction for swinging said swingable element in said other direction.

6. In a side-delivery rake having an arched supporting frame adapted to be held at its forward end by a propelling means and at its rearward end by a two-wheel axle, a cylinder frame, a raking reel rotatably carried by said cylinder frame, a V-shaped framework secured in spaced-apart relationship to said cylinder frame and extending rearwardly therefrom, and means adjacent the rear of the supporting frame for swingably supporting said framework adjacent the apex thereof about a transverse axis for positioning the raking reel obliquely with respect to the direction of travel of said side-delivery rake, said cylinder frame being biased for swinging in one direction, the improvement comprising a pair of spaced lift mechanisms each of said lift mechanisms comprising a bell crank swingable about a fixed pivot, a link pivotally connected to one leg of said bell crank and movable in a lifting direction in response to rocking of said bell crank in one direction, a crank swingable about a fixed pivot longitudinally spaced from the first mentioned pivot, a power link pivotally connected to said crank adjacent one end thereof, a lost motion connection between the other leg of said bell crank and said power link for rocking said bell crank in said one direction in response to rocking of said crank in one direction, power-operated means for rocking said crank, an adjustable link rotatably supported about a fixed pivot, and a lost motion connection between said adjustable link and said other leg of said bell crank said bell crank being rockable a predetermined distance in said one direction without effecting movement to said power link or to said adjustable link.

7. In a side-delivery rake having a movably supported frame and a cylinder frame carried by the frame for up-and-down swinging movement, the improvement comprising a lift mechanism including a bell crank swingable about a fixed pivot, a lifting link pivotally connected to one leg of said bell crank and adapted to be moved in a lifting direction in response to rocking of said bell crank in one direction, a crank swingable about a fixed pivot longitudinally spaced from the first mentioned pivot, a power link pivotally connected to said crank adjacent one end thereof, a lost motion connection between the other leg of said bell crank and said power link adjacent the other end thereof for rocking said bell crank in said one direction in response to said crank being rocked in one direction, power-operated means for rocking said crank, an adjustable link rotatably supported about a fixed pivot and extending in the direction of said bell crank, said link being manually operative for lineal adjustment thereof, and a lost motion connection between said other leg of said bell crank and said adjustable link.

8. A lift mechanism for use with an implement having a movably supported frame and a swingable element connected to the frame and biased to swing in one direction, said lift mechanism comprising a rockable member pivoted on said frame, means interconnecting one end of said rockable member and said swingable member, a link rotatably supported on said frame while being prevented from moving axially with respect thereto and extending in the direction of said rockable member, said link being manually operative for effecting lineal adjustment thereof, a looped strap fixed to said link adjacent said rockable member, means fixed to said rockable member adjacent the other end thereof and slidably received in said looped strap, whereupon, said rockable member is held against swinging movement in said one direction in predetermined positions, said rockable member being freely swingable within the limits defined by said looped strap independently of any lineal adjustment of said link, lineal adjustment of said link being effective for supporting said swingable element in predetermined positions with respect to said frame.

9. A lift mechanism for use with an implement having a movably supported frame and a swingable element connected to the frame and biased to swing in one direction, said lift mechanism comprising a rockable member pivoted on said frame, means interconnecting one end of said rockable member and said swingable element, a rock shaft rotatably carried by said frame, said rock shaft having a rock arm depending therefrom, a power link pivotally secured to said rock arm and extending in the direction of said rockable member, a looped strap fixed to said power link adjacent said rockable member, means fixed to said rockable member adjacent the other end thereof and slidably received in said looped strap whereby said rockable member is freely rockable within the limits defined by said looped strap, and a power operated cylinder carried by said frame and connected to said rock shaft for rocking said rock shaft in one direction for swinging said swingable element in the other direction.

10. A lift mechanism for use with an implement having a movably supported frame and a swingable element carried by the frame and biased to swing in one direction, said lift mechanism comprising a rockable member pivoted on the frame, means interconnecting one end of said rockable member and said swingable element, a rock shaft rotatably carried by said frame, said rock shaft having a rock arm depending therefrom, a power link pivotally secured to said rock arm and extending in the direction of said rockable member, a looped strap fixed to said power link adjacent said rockable member, means fixed to said rockable member adjacent the other end thereof and slidably received in said looped strap for interconnecting said rockable member to said power link, said rockable member being freely swingable within the limits defined by said looped strap, and a power-operated cylinder carried by said frame and connected to said rock shaft for rocking said rock shaft in one direction for rocking said rockable member, for swinging said swingable member in the other direction.

11. A lift mechanism for use with an implement having a movably supported frame and a swingable element carried by the frame and biased to swing in one direction, said lift mechanism comprising a bell crank pivoted on said frame, said bell crank including a pair of plates fixed in predetermined spaced apart relationship, a link interconnecting one end of said bell crank and said swingable element, said link being connected between said plates adjacent corresponding ends thereof, a rock shaft rotatably carried by said frame, said rock shaft having a rock arm depending therefrom, a power link pivotally secured to said rock arm and extending in the direction of said bell crank, a looped strap fixed to said power link adjacent said bell crank, means fixed to the other leg of said bell crank and interconnecting corresponding ends of said plates and slidably received by said looped strap whereby said bell crank is freely rockable within the limits defined by said looped strap, and a power operated cylinder carried by said frame and connected to said rock shaft for rocking said shaft in one direction for rocking said bell crank for swinging said swingable element in the other direction.

MATTHEW E. HAMILTON.

References Cited in the file of this patent

UNITED STATES PATENTS

| Number | Name | Date |
| --- | --- | --- |
| 2,491,211 | Rietz | Dec. 13, 1949 |
| 2,518,389 | Sisulak | Aug. 8, 1950 |
| 2,531,934 | Crose | Nov. 28, 1950 |
| 2,609,649 | Watson | Sept. 9, 1952 |